(12) United States Patent
Noll et al.

(10) Patent No.: US 12,505,086 B2
(45) Date of Patent: *Dec. 23, 2025

(54) TRANSPORT OF NON-STANDARDIZED DATA BETWEEN RELATIONAL DATABASE OPERATIONS

(71) Applicant: SAP SE, Walldorf (DE)

(72) Inventors: Stefan Noll, Sandhausen (DE); Paul Willems, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,230

(22) Filed: Feb. 7, 2024

(65) Prior Publication Data

US 2024/0220475 A1 Jul. 4, 2024

Related U.S. Application Data

(63) Continuation of application No. 17/733,507, filed on Apr. 29, 2022, now Pat. No. 11,947,514.

(51) Int. Cl.
*G06F 16/22* (2019.01)
*G06F 16/23* (2019.01)
*G06F 16/2453* (2019.01)
*G06F 16/2455* (2019.01)
*G06F 16/28* (2019.01)

(52) U.S. Cl.
CPC ...... *G06F 16/2282* (2019.01); *G06F 16/2322* (2019.01); *G06F 16/2329* (2019.01); *G06F 16/24532* (2019.01); *G06F 16/24564* (2019.01); *G06F 16/285* (2019.01); *G06F 16/288* (2019.01)

(58) Field of Classification Search
CPC ............... G06F 16/245; G06F 16/2471; G06F 16/2452; G06F 2201/86; G06F 16/2282; G06F 16/285
USPC ........................................................ 707/769
See application file for complete search history.

(56) References Cited

U.S. PATENT DOCUMENTS

2020/0065303 A1* 2/2020 Bhattacharjee ....... G06F 16/278
2021/0342490 A1* 11/2021 Briancon ................ G06F 21/14

* cited by examiner

*Primary Examiner* — Hung T Vy
(74) *Attorney, Agent, or Firm* — Mintz Levin Cohn Ferris Glovsky and Popeo, P.C.

(57) ABSTRACT

A method for processing non-standardized data in a relational database may include identifying, within a sequence of operations forming a query pipeline for executing a query, a first operation ingesting a non-standardized data. In response to identifying the first operation ingesting the non-standardized data, a second operation may be inserted before the first operation. The non-standardized data may be output by a third operation preceding the first operation or a source external to the query pipeline. The second operation may serialize the non-standardized data for ingestion by the first operation, for example, by generating a relational table populated by the non-standardized data. The query may be executed by performing the sequence of operations included in the query pipeline. Related systems and computer program products are also provided.

20 Claims, 7 Drawing Sheets

| April 22, 2022 13:53:20.0 | TAB0510 |
| May 15, 2021 08:15:20.0 | TAB1050 |
| January 30, 2019 12:00:20.0 | TAB0005 |
| August 4, 2020 19:45:20.0 | TAB0135 |

TRANSPORT OF NON-STANDARDIZED DATA BETWEEN RELATIONAL DATABASE OPERATIONS

CROSS REFERENCE TO RELATED APPLICATIONS

This application is a continuation of application Ser. No. 17/733,507 filed Apr. 19, 2022, entitled "TRANSPORT OF NON-STANDARDIZED DATA BETWEEN RELATIONAL DATABASE OPERATIONS." The disclosure of which is incorporated herein by reference in its entirety.

TECHNICAL FIELD

The subject matter described herein relates generally to database processing and more specifically to the exchange of non-standardized data in a relational database.

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, are provided for exchanging non-standardized data in a relational database. In some example embodiments, there is provided a system that includes at least one processor and at least one memory. The at least one memory may include program code that provides operations when executed by the at least one processor. The operations may include: identifying, within a sequence of operations comprising a query pipeline for executing a query, a first operation ingesting the non-standardized data; in response to identifying the first operation ingesting the non-standardized data, inserting, before the first operation, a second operation to serialize at least a portion of the non-standardized data for ingestion by the first operation; and executing the query by at least performing the sequence of operations comprising the query pipeline.

In some variations, one or more features disclosed herein including the following features can optionally be included in any feasible combination. The second operation may serialize at least the portion of the non-standardized data by generating a relational table populated by at least the portion of the non-standardized data.

In some variations, each row of the relational table may be populated with a different type of the non-standardized data.

In some variations, each column of the relational table may be populated with a different type of the non-standardized table.

In some variations, the non-standardized data may include one or more data statistics.

In some variations, the one or more data statistics may include a row count, a column count, and/or a datatype.

In some variations, the non-standardized data may include synchronization information.

In some variations, the synchronization information may include a versioning timestamp and/or a table identifier.

In some variations, the non-standardized data may include a type of algorithm applied to execute the query, temporary and/or auxiliary data structures used during the executing of the query, information about parallelization or scheduling, and/or status information.

In some variations, the non-standardized data output may be output by a third operation preceding the first operation. The second operation may be inserted between the first operation and the third operation.

In some variations, the non-standardized data may be output by a source external to the query pipeline.

In some variations, the operations may further include: in response to determining that the first operation operates on the non-standardized data in its original format, inserting, between the second operation and the first operation, a third operation to convert the serialized data back to the original format for use by the first operation.

In another aspect, there is provided a method for exchanging non-standardized data in a relational database. The method may include: identifying, within a sequence of operations comprising a query pipeline for executing a query, a first operation ingesting the non-standardized data; in response to identifying the first operation ingesting the non-standardized data, inserting, before the first operation, a second operation to serialize at least a portion of the non-standardized data for ingestion by the first operation; and executing the query by at least performing the sequence of operations comprising the query pipeline.

In some variations, one or more features disclosed herein including the following features can optionally be included in any feasible combination. The second operation may serialize at least the portion of the non-standardized data by generating a relational table in which each row or column of the relational table is populated by a different type of the non-standardized data.

In some variations, the non-standardized data may include one or more data statistics comprising at least one of a row count, a column count, or a datatype.

In some variations, the non-standardized data may include synchronization information comprising at least one of a versioning timestamp or a table identifier.

In some variations, the non-standardized data may include a type of algorithm applied to execute the query, temporary and/or auxiliary data structures used during the executing of the query, information about parallelization or scheduling, and/or status information.

In some variations, the non-standardized data output may be output by a third operation preceding the first operation or a source external to the query pipeline.

In some variations, the method may further include: in response to determining that the first operation operates on the non-standardized data in its original format, inserting, between the second operation and the first operation, a third operation to convert the serialized data back to the original format for use by the first operation.

In another aspect, there is provided a computer program product including a non-transitory computer readable medium storing instructions. The instructions may cause operations may executed by at least one data processor. The operations may include: identifying, within a sequence of operations comprising a query pipeline for executing a query, a first operation ingesting the non-standardized data; in response to identifying the first operation ingesting the non-standardized data, inserting, before the first operation, a second operation to serialize at least a portion of the non-standardized data for ingestion by the first operation; and executing the query by at least performing the sequence of operations comprising the query pipeline.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the exchange of non-standardized data between relational database operations, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

An in-memory relational database may utilize main memory for the primary storage of database tables. In some cases, the in-memory relational database may be implemented as a column-oriented database (or a columnar database) that stores data from database tables by columns instead of by rows. As noted, each tuple of a relation may correspond to a record occupying one row of a database table while the columns of the database table may store the values of the common attributes shared by multiple tuples. Thus, in the columnar database, the values occupying each column of the database table, which may span multiple rows (or records) of the database table, may be stored sequentially in one or more data pages, with each data page storing at least a portion of a column. The in-memory column-oriented relational database may support efficient data compression and partitioning for massively parallel processing. Moreover, because the in-memory database is directly accessible by the central processing unit (CPU) of the computing engine, transactions accessing the in-memory database may be executed to provide near-instantaneous results.

The throughput and storage capacity of a database, such as an in-memory column-oriented relational database, may be maximized by distributing the processing and storage of data across multiple computing nodes. A single database table may therefore be divided into multiple partitions (or internal tables), for example, through one or more of hash partitioning, round-robin partitioning, and range partitioning, and stored across multiple computing nodes. Doing so may maximize opportunities for parallelization in which a single query is divided into multiple tasks and assigned to individual worker threads for parallel execution. As used herein, the term "worker thread" may refer to a thread or thread of execution, which is a sequence of instructions managed independently by a scheduler. Individual worker threads (e.g., the corresponding sequences of instructions) may be scheduled for sequential execution and/or parallel execution by one or multiple central processing units (CPUs).

A query operating on a dataset (e.g., including one or more database tables) may be associated with a query plan, which may include a pipeline having a sequence of operations for executing the query. Although each operation in the query plan may operate on relational data, in some cases, one or more of the operations in the query plan may generate non-standardized data, which may include internal data that exists temporarily for used during the processing of the query. This non-standardized data may be arbitrary in format, meaning that the internal data may be relational or non-standardized in form. For example, a first operation in the query plan may generate, in addition to relational data, non-standardized data such as data statistics (e.g., row count, column count, data types, and/or the like) and synchronization information (e.g., versioning timestamps, table names, table identifiers and/or the like). Examples of non-standardized data may include information about the type of algorithm applied to perform the query processing, temporary and/or auxiliary data structures used during the query processing, information about parallelization or scheduling, and status information such as errors, execution progress, resource usage, and/or performance metrics.

This non-standardized data, which may be in any arbitrary format, is then ingested by a second operation that follows the first operation in the query plan. For instance, in some cases, the execution of the second operation on the relational data output by the first operation may require at least a portion of the non-standardized data output by the first operation as well. Alternatively and/or additionally, the execution of the second operation on the relational data output by the first operation may require non-standardized data coming from a different source that is, for example, not a preceding operation in the query pipeline. Absent a mechanism to facilitate the exchange of non-standardized data, such as between the first operation and the second operation, the second operation may be unable to access the non-standardized data required to process the relational data output by the first operation. A mechanism to facilitate the exchange of non-standardized data may be further necessitated in cases where the first operation and the second operation are being performed on different computing nodes.

In some example embodiments, the database execution engine may be configured to facilitate the exchange of non-standardized data, such as data statistics and synchronization information, between successive relational operations in a query plan. Alternatively and/or additionally, the database execution engine may also facilitate the exchange of non-standardized data between a relational operation in the query and one or more external sources of the non-standardized data. For example, in some cases, the database execution engine may determine that the second operation in the query plan requires non-standardized data from the preceding first operation (or an external source that is not a preceding operation in the query pipeline). Alternatively and/or additionally, the database execution engine may determine that the first operation in the query plan may output non-standardized data, which are then ingested by the second operation. In either case, the database execution engine may insert, before the second operation, a serialization operation configured to transform the non-standardized data output by the first operation (or another external source) into a relational data for ingestion by the second operation. For instance, the serialization operation may serialize at least a portion of the non-standardized data by generating, for ingestion by the second operation, a relational table populated by the non-standardized data. In some instances, the non-standardized data may be serialized for transport to the second operation but a fourth operation may be added to transform the relational table containing the standardized format back into the original non-standardized data for use by the second operation.

Figure 1:
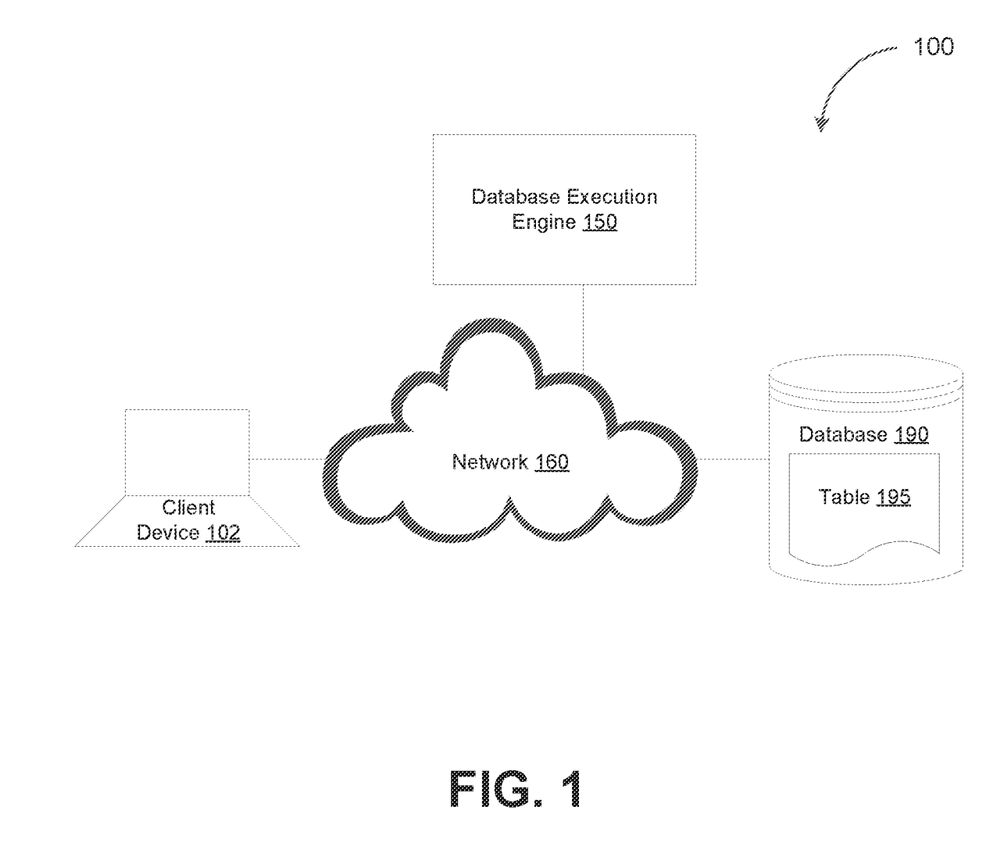
FIG. 1 depicts a system diagram illustrating an example of a database system, in accordance with some example embodiments.

FIG. 1 depicts a system diagram illustrating an example of a database system 100, in accordance with some example embodiments. Referring to FIG. 1, the database system 100 may include one or more client devices 102, a database execution engine 150, and one or more databases 190. As shown in FIG. 1, the one or more client devices 102, the database execution engine 150, and the one or more databases 190 may be communicative coupled via a network 160. The one or more databases 190 may include a variety of relational databases including, for example, an in-memory database, a column-based database, a row-based database, and/or the like. The one or more client devices 102 may include processor-based devices including, for example, a mobile device, a wearable apparatus, a personal computer, a workstation, an Internet-of-Things (IoT) appliance, and/or the like. The network 140 may be a wired network and/or wireless network including, for example, a public land mobile network (PLMN), a local area network (LAN), a virtual local area network (VLAN), a wide area network (WAN), the Internet, and/or the like.

Figure 2:
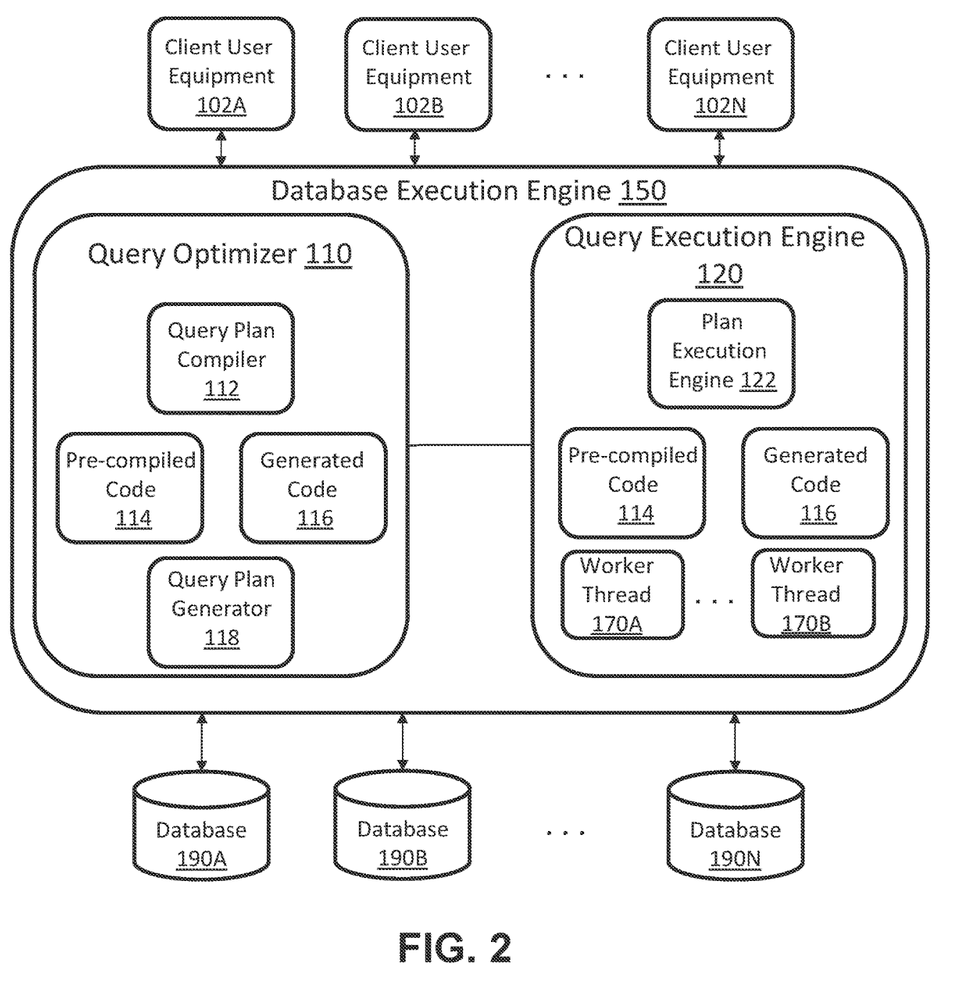
FIG. 2 depicts a block diagram illustrating an example of a database execution engine, in accordance with some example embodiments.

FIG. 2 depicts a block diagram illustrating an example of the database execution engine 150, in accordance with some example embodiments. As shown in FIG. 2, the one or more databases 190, which may include a first database 190A, a second database 190B, and a third database 190C, can represent the database layer of a database management system (DBMS) where data may be persisted and/or stored in a structured way, and where the data may be queried or operated on using operations such as SQL commands or other types of commands/instructions to provide reads, writes, and/or perform other operations. To illustrate by way of an example, the one or more client devices 102, which may include the client devices 102A-N, may send a query via the database execution engine 150 to the database layer including the one or more databases 190, which may represent a persistence and/or storage layer where database tables may be stored and/or queried. The query may be sent via a connection, such as a wired connection and/or wireless connection (e.g., the Internet, cellular links, WiFi links, and/or the like) provided, for example, by the network 160.

Referring again to FIG. 2, the database execution engine 150 may include a query optimizer 110, such as a SQL optimizer and/or another type of optimizer, to receive at least one query from the one or more client devices 102 and generate a corresponding query plan (which may be optimized) for execution by a query execution engine 120. The query optimizer 110 may receive a request, such as a query, and then form or propose an optimized query plan. The query plan (which may be optimized) may be represented as a so-called "query algebra" or "relational algebra." The query plan may propose an optimum query plan with respect to, for example, the execution time of the overall query. To optimize a query, the query plan optimizer 110 may obtain one or more costs for the different ways the execution of the query plan may be performed, and the costs may be in terms of execution time at, for example, the one or more databases 190.

A query plan compiler 112 may enable compilation of at least a portion of the query plan. The query plan compiler 112 may compile the optimized query algebra into operations, such as program code and/or any other type of command, operation, object, or instruction. This code may include pre-compiled code 114 (which may be pre-compiled and stored and then selected for certain operations in the query plan) and/or generated code 116 generated specifically for execution of the query plan. For example, the query plan compiler 112 may select pre-compiled code 114 for a given operation as part of the optimization of the query plan, while for another operation in the query plan the query plan compiler 112 may allow a compiler to generate the code (i.e., generated code 116). The pre-compiled code 114 and the generated code 116 represent code for executing the query plan, and this code may be provided to a query plan generator 118, which interfaces with the query execution engine 120.

In some example embodiments, the query optimizer 110 may optimize the query plan by compiling and generating code. Moreover, the query optimizer 110 may optimize the query plan to enable pipelining during execution. The query execution engine 120 may receive, from the query plan generator 118, compiled code to enable execution of the optimized query plan, although the query execution engine 120 may also receive code or other commands directly from a higher-level application or another source such as the one or more client devices 102. The pre-compiled code 114 and/or the generated code 116 may be provided to a plan execution engine 122 of the query execution engine 120. The plan execution engine 122 may then prepare the plan for execution, and this query plan may include the pre-compiled code 114 and/or the generated code 116. When the code for the query plan is ready for execution during runtime, the query execution engine 120 may step through the code, performing some of the operations within the database execution engine 150 and sending some of the operations (or commands in support of an operation, such as a read, write, and/or the like) for execution at one or more of one or more database 190.

The query execution engine 120 may, as noted, be configured to handle different types of databases and the corresponding persistent layers and/or tables therein. For example, the one or more databases 190 may include at least one row-oriented database, in which case an insert is performed by adding a row with a corresponding row identifier. Alternatively and/or additionally, where the one or more databases 190 include one or more column store databases, which may use dictionaries and compressive techniques when inserting data into a table. Where the database layer includes multiple different types of databases, the query execution engine 120 may perform execution related to handling the differences between different types of databases such as row-oriented databases and column store databases. This may enable a reduction in processing at the database layer, for example, at each of the one or more databases 190. Moreover, the query execution engine 120 may perform other operations including rule-based operations, such as joins and projections, as well as filtering, group by, multidimensional analysis, and/or the like to reduce the processing burden on the database layer. In this way, the query execution engine 120 may execute these and other complex operations, while the one or more databases 190 can perform simpler operations to reduce the processing burden at the one or more databases 190.

In some example embodiments, the query execution engine 120 may run, as noted above, the generated code 116 generated for some query operations, while the pre-compiled code 114 may be run for other operations. Moreover, the query execution engine 120 may combine the generated code 116 with the pre-compiled code 114 to further optimize execution of query related operations. In addition, the query execution engine 120 may provide for a plan execution framework that is able to handle data chunk(s), pipelining, and state management during query execution. Furthermore, the query execution engine 120 may provide the ability to access table storage via an abstract interface to a table adapter, which may reduce dependencies on specific types of storage/persistence layers (which may enable use with different types of storage/persistence layers).

In some example embodiments, the database layer may provide distributed data storage in which the processing and storage of data is distributed across multiple nodes including, for example, the first database 190A, the second database 190B, the third database 190C, and/or the like. Accordingly, to store a database table 195 at the one or more databases 190, the database execution engine 150 may divide the database table 195 into multiple partitions by applying one or more of a hash partitioning, round-robin partitioning, and range partitioning. For example, the database table 195 may be divided into a first partition stored at the first database 190A, a second partition 165b stored at a second database 165B, and a third partition 165c stored at the third database 165C.

Upon being optimized by the query plan optimizer 110, the query plan may include a pipeline having a sequence of operations for executing the query. Although each operation in the query plan may operate on relational data, in some cases, one or more of the operations in the query plan may generate non-standardized data having an arbitrary format. For example, a first operation in the query plan may generate, in addition to relational data, non-standardized data such as data statistics and synchronization information. This non-standardized data, which may be in any arbitrary format, is then ingested by a second operation that follows the first operation in the query plan. For instance, in some cases, the execution of the second operation on the relational data output by the first operation may require at least a portion of the non-standardized data output by the first operation as well.

In some example embodiments, the database execution engine 150, for example, the plan execution engine 122 of the query execution engine 120 may facilitate the delivery of non-standardized data from an external source to a relational operation in the query plan and/or the exchange of non-standardized data between successive relational operations in the query plan. As noted, examples of non-standardized data may include data statistics, such as row count, column count, and data types, and synchronization data, such as versioning timestamps, table names, and table identifiers. In some cases, the plan execution engine 122 may determine that the second operation in the query plan requires non-standardized data from the preceding first operation or an external source. Alternatively and/or additionally, the plan execution engine 122 may determine that the first operation in the query plan may output non-standardized data, which are then ingested by the second operation. In response to determining that the first operation outputs non-standardized data and/or the second operation ingests non-standardized data (e.g., from either the preceding first operation or an external source), the plan execution engine 122 may insert, before the second operation, a serialization operation configured to transform the non-standardized data for ingestion by the second operation. For example, the serialization operation may serialize at least a portion of the non-standardized data by generating, for ingestion by the second operation, a relational table populated by the non-standardized data.

Figure 3A:
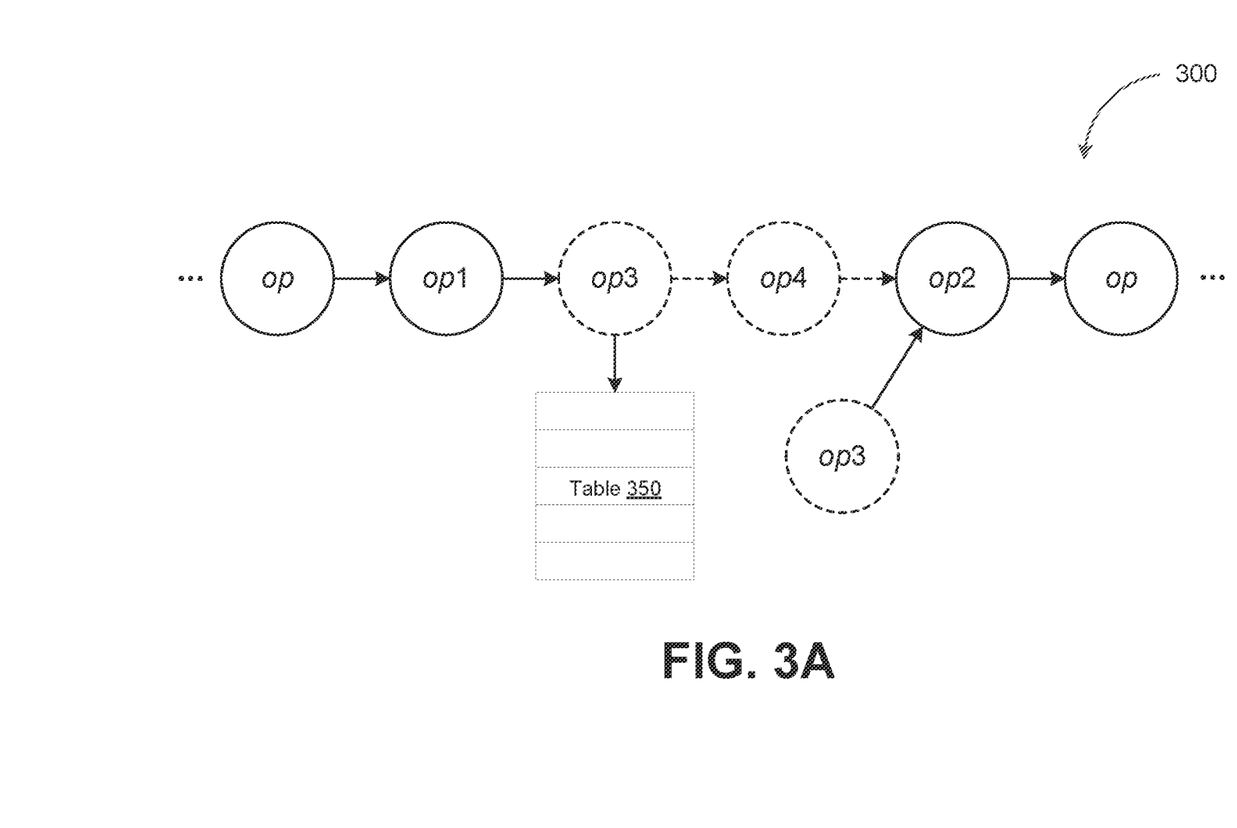
FIG. 3A depicts a schematic diagram illustrating an example of a query pipeline being modified to support the exchange of non-standardized data between relational database operations, in accordance with some example embodiments.

To further illustrate, FIG. 3A depicts a schematic diagram illustrating an example of a query pipeline 300 being modified to support the exchange of non-standardized data between relational database operations, in accordance with some example embodiments. The example of the query pipeline 300 shown in FIG. 3A includes a sequence of operations that includes a first operation op1 followed by a second operation op2. In some example embodiments, the plan execution engine 122 may determine that the first operation op1 outputs non-standardized data and/or the second operation op2 ingests non-standardized data. Accordingly, the plan execution engine 122 may insert, between the first operation op1 and the second operation op2, a third operation op3 configured to serialize the non-standardized data being exchanged between the first operation op1 and the second operation op2. For example, the third operation op3 may serialize at least a portion of the non-standardized data output by the first operation op1 by generating a relational table 350 populated by the non-standardized data. Serializing the non-standardized data may facilitate the exchange of such data between the first operation op1 and the second operation op2 which may, in some cases, be performed at different computing nodes.

Alternatively, in some cases, the second operation op2 may also ingest non-standardized data from an external source that is not the preceding first operation op1 in the query pipeline 300. Accordingly, the third operation op3 may be inserted before the second operation op2 albeit not between the first operation op1 and the second operation op2. The third operation op3 in this case may be configured to serialize the non-standardized data from the external source including by generating the relational table 350 populated by the non-standardized data.

In some cases, the third operation op3 may serialize the non-standardized data for transport to the second operation op2 but the second operation op2 may nevertheless operate on the non-standardized data in its original form. Accordingly, the plan execution engine 122 may insert a fourth operation op4 before the second operation op2 in order to convert the data populating the relational table 350 back into its original format for ingestion by the second operation op2.

Figure 3B:
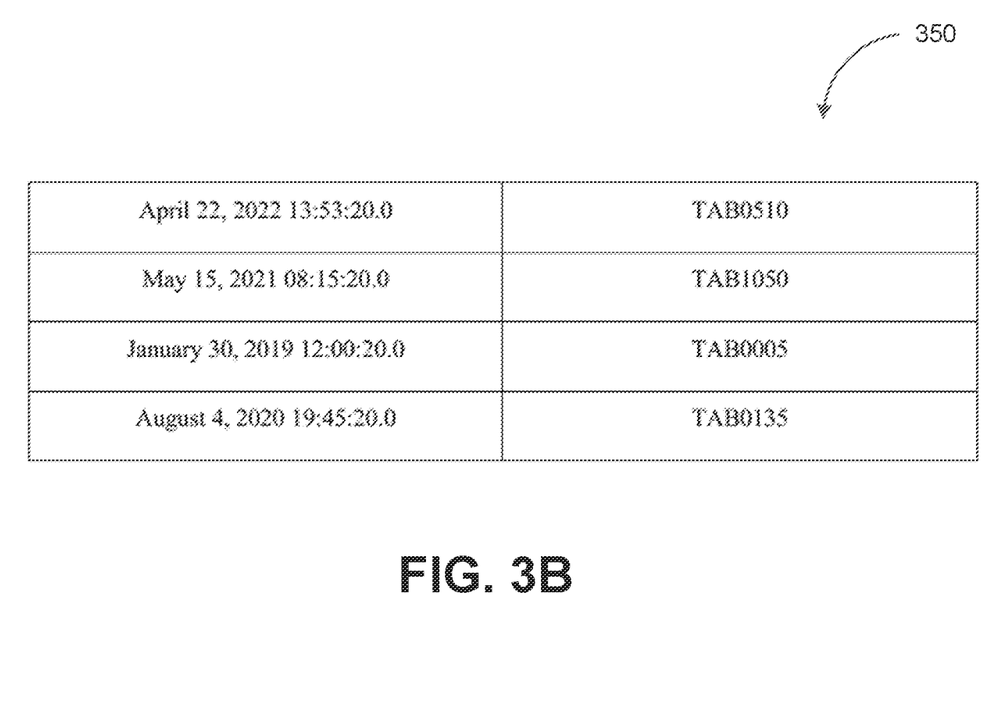
FIG. 3B depicts an example of a relational table populated with serialized non-standardized data, in accordance with some example embodiments.

FIG. 3B depicts one example of the relational table 350 containing serialized non-standardized data, in accordance with some example embodiments. Referring to FIG. 3B, in some example embodiments, the third operation op3 may generate the relational table 350 by at least populating each column of the relational table 350 with a different type of non-standardized data. For instance, the example of the relational table 350 shown in FIG. 3B includes a first column containing versioning timestamps and a second column containing table identifiers.

Figure 3C:
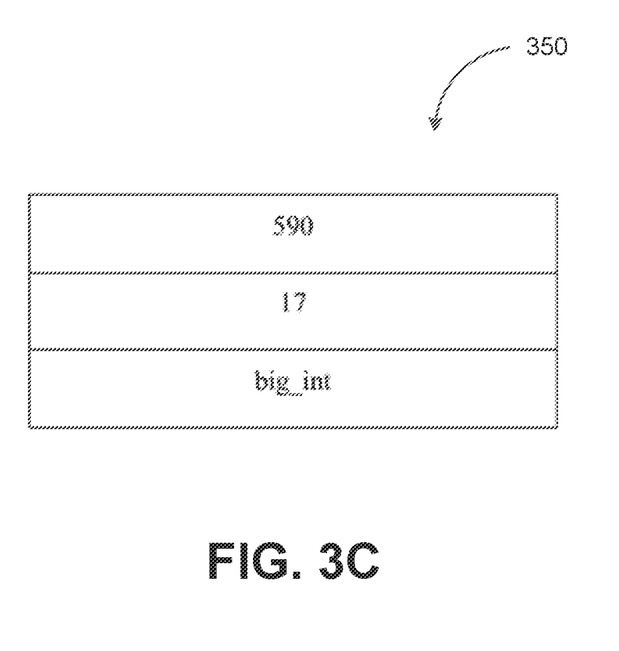
FIG. 3C depicts an example of a relational table populated with serialized non-standardized data, in accordance with some example embodiments.

FIG. 3C depicts another example of the relational table 350 containing serialized non-standardized data, in accordance with some example embodiments. In some example embodiments, the third operation op3 may generate the relational table 350 by at least populating each row of the relational table 350 with a different type of non-standardized data. Accordingly, the example of the relational table 350 shown in FIG. 3C includes a first row containing a row count, a second row containing a column count, and a third row containing a datatype.

Figure 4:
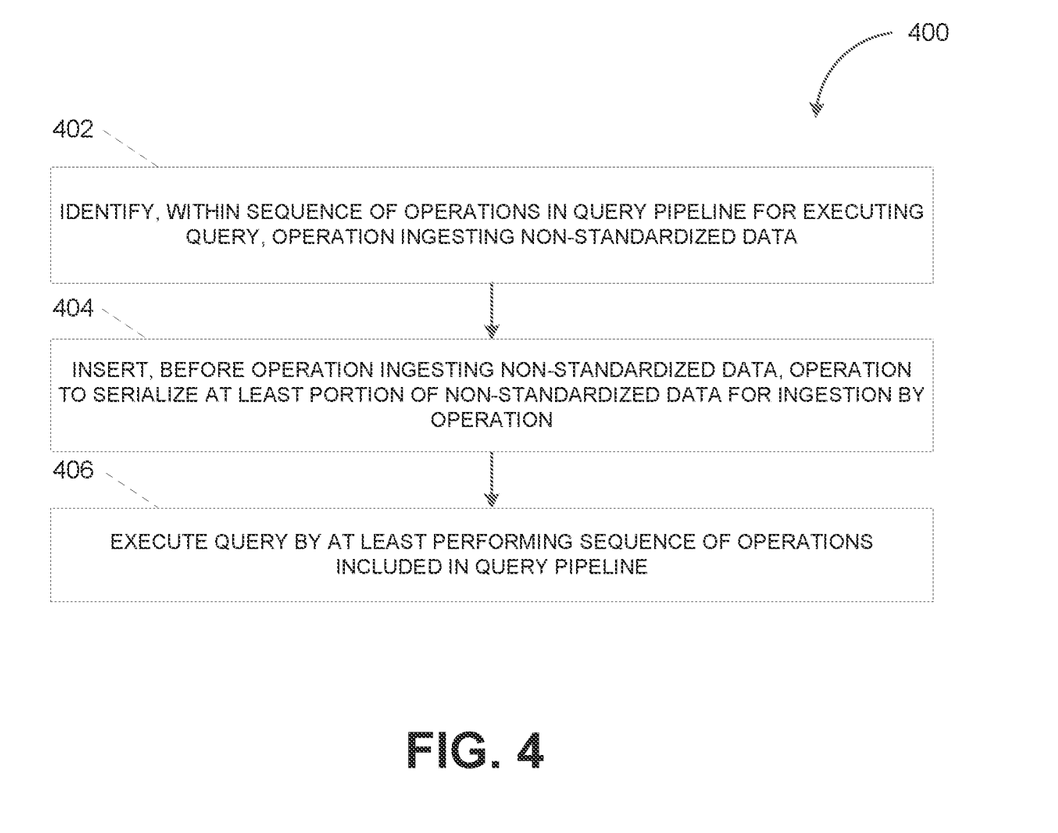
FIG. 4 depicts a flowchart illustrating an example of a process for processing non-standardized data in a relational database, in accordance with some example embodiments.

FIG. 4 depicts a flowchart illustrating an example of a process 400 for processing non-standardized data in a relational database, in accordance with some example embodiments. Referring to FIG. 4, the process 400 may be performed by the database execution engine 150 to execute a query operating on a dataset stored in the database 190. In particular, the process 400 may be performed by the database execution engine 150, for example, the plan execution engine 122 of the query execution engine 120, to facilitate the exchange of non-standardized data between successive relational operations in the corresponding query plan.

At 402, the database execution engine 150 may identify, within a sequence of operations in a query pipeline for executing a query, an operation ingesting the non-standardized data. For instance, in the example of the query pipeline 300 shown in FIG. 3A, the database execution engine 150 may determine that the first operation op1 outputs non-standardized data and/or the second operation op2 ingests non-standardized data from either the first operation op1 or an external source. Accordingly, absent a mechanism to facilitate the exchange of non-standardized data, the second operation op2 may be unable to access the non-standardized data output by the first operation op1 or the external source.

At 404, the database execution engine 150 may insert, before the operation ingesting the non-standardized data, an operation to serialize at least a portion of the non-standardized data for ingestion by the operation. In some example embodiments, upon identifying the first operation op1 outputting non-standardized data and/or the second operation op2 ingesting the non-standardized data (e.g., from the first operation op1 or an external source), the database execution engine 150 may insert the third operation op3 before the second operation op2. When executed, the third operation op3 may serialize at least a portion of the non-standardized data output by the first operation op1 or the external source for ingestion by the second operation op2. For example, the third operation op3 may serialize the non-standardized data by at least generating the relational table 350 populated by the non-standardized data. FIG. 3B depicts one example of the relational table 350 in which each column of the relational table 350 are occupied by a different type non-standardized data. Alternatively, FIG. 3C shows that the third operation op3 may also generate the relational table 350 by at least populating each row of the relational table 350 with a different type of non-standardized data. In some cases, where the non-standardized data is serialized for transportation to the second operation op2 but the second operation op2 operates on the non-standardized data in its original format, the fourth operation op4 may be inserted before the second operation op2 in order to transform the serialized data occupying the relational data 350 back to its original format for ingestion by the second operation op2.

At 406, the database execution engine 150 may execute the query by at least performing the sequence of operations included in the query pipeline. For instance, in the example shown in FIG. 3A, the database execution engine 150 may execute the query by performing the sequence of operations included in the query pipeline 300, which includes performing the third operation op3 and/or the fourth operation op4 inserted before the second operation op2. As noted, the third operation op3 may serialize at least a portion of the non-standardized data output by the first operation op1 or the external source by generating the relational table 350 populated by the non-standardized data. In cases where the second operation op2 operates on the non-standardized data in its original form, the fourth operation op4 may be performed to transform the data occupying the relational table 350 back to its original form.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: identifying, within a sequence of operations comprising a query pipeline for executing a query, a first operation ingesting the non-standardized data; in response to identifying the first operation ingesting the non-standardized data, inserting, before the first operation, a second operation to serialize at least a portion of the non-standardized data for ingestion by the first operation; and executing the query by at least performing the sequence of operations comprising the query pipeline.

Example 2: The system of Example 1, wherein the second operation serializes at least the portion of the non-standardized data by generating a relational table populated by at least the portion of the non-standardized data.

Example 3: The system of Example 2, wherein each row of the relational table is populated with a different type of the non-standardized data.

Example 4: The system of any one of Examples 2 to 3, wherein each column of the relational table is populated with a different type of the non-standardized table.

Example 5: The system of any one of Examples 1 to 4, wherein the non-standardized data includes one or more data statistics.

Example 6: The system of Example 5, wherein the one or more data statistics include a row count, a column count, and/or a datatype.

Example 7: The system of any one of Examples 1 to 6, wherein the non-standardized data includes synchronization information.

Example 8: The system of Example 7, wherein the synchronization information includes a versioning timestamp and/or a table identifier.

Example 9: The system of any one of Examples 1 to 8, wherein the non-standardized data includes a type of algorithm applied to execute the query, temporary and/or auxiliary data structures used during the executing of the query, information about parallelization or scheduling, and/or status information.

Example 10: The system of any one of Examples 1 to 9, wherein the non-standardized data output is output by a third operation preceding the first operation, and wherein the second operation is inserted between the first operation and the third operation.

Example 11: The system of any one of Examples 1 to 10, wherein the non-standardized data is output by a source external to the query pipeline.

Example 12: The system of any one of Examples 1 to 11, where in the operations further comprise: in response to determining that the first operation operates on the non-standardized data in its original format, inserting, between the second operation and the first operation, a third operation to convert the serialized data back to the original format for use by the first operation.

Example 13: A method, comprising: identifying, within a sequence of operations comprising a query pipeline for executing a query, a first operation ingesting the non-standardized data; in response to identifying the first operation ingesting the non-standardized data, inserting, before the first operation, a second operation to serialize at least a portion of the non-standardized data for ingestion by the first operation; and executing the query by at least performing the sequence of operations comprising the query pipeline.

Example 14: The method of Example 13, wherein the second operation serializes at least the portion of the non-standardized data by generating a relational table in which each row or column of the relational table is populated by a different type of the non-standardized data.

Example 15: The method of any one of Examples 13 to 14, wherein the non-standardized data includes one or more data statistics comprising at least one of a row count, a column count, or a datatype.

Example 16: The method of any one of Examples 13 to 15, wherein the non-standardized data includes synchronization information comprising at least one of a versioning timestamp or a table identifier.

Example 17: The method of any one of Examples 13 to 16, wherein the non-standardized data includes a type of algorithm applied to execute the query, temporary and/or auxiliary data structures used during the executing of the query, information about parallelization or scheduling, and/or status information.

Example 18: The method of any one of Examples 13 to 17, wherein the non-standardized data output is output by a third operation preceding the first operation or a source external to the query pipeline.

Example 19: The method of nay one of Examples 13 to 18, further comprising:
in response to determining that the first operation operates on the non-standardized data in its original format, inserting, between the second operation and the first operation, a third operation to convert the serialized data back to the original format for use by the first operation.

Example 20: A non-transitory computer readable medium storing instructions, which when executed by at least one data processor, result in operations comprising: identifying, within a sequence of operations comprising a query pipeline for executing a query, a first operation ingesting the non-standardized data; in response to identifying the first operation ingesting the non-standardized data, inserting, before the first operation, a second operation to serialize at least a portion of the non-standardized data for ingestion by the first operation; and executing the query by at least performing the sequence of operations comprising the query pipeline.

Figure 5:
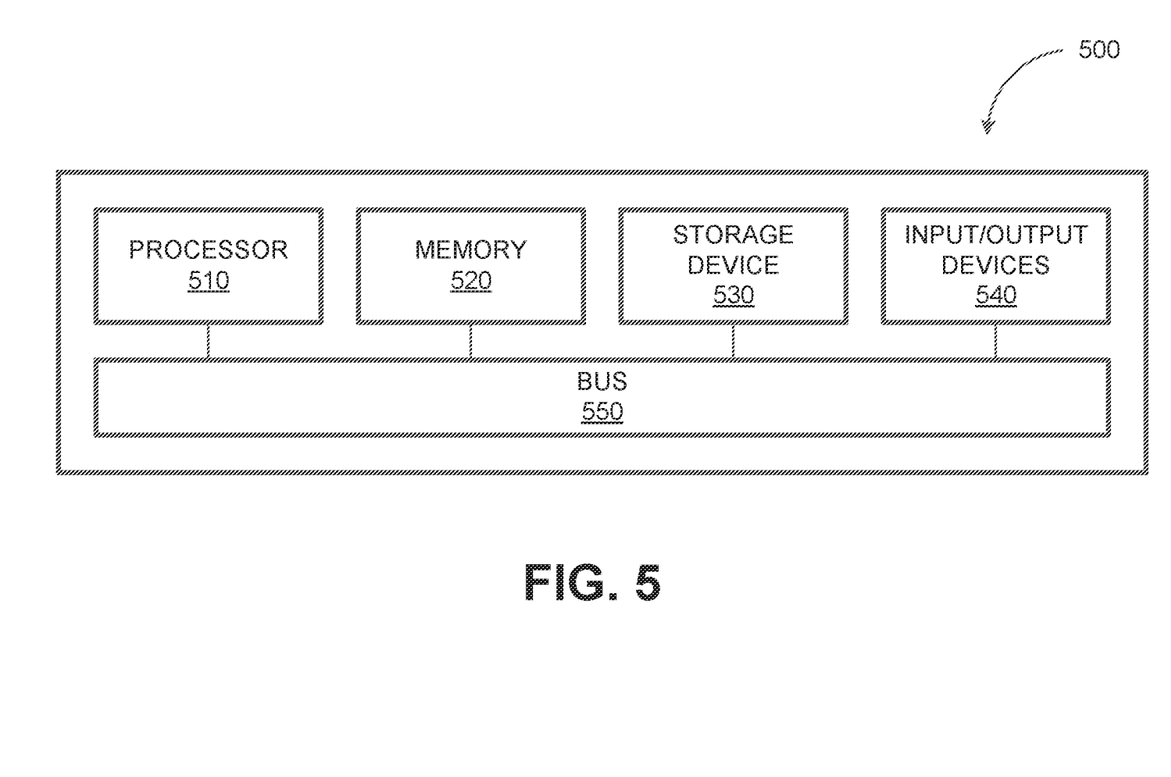
FIG. 5 depicts a block diagram illustrating an example of a computing system, in accordance with some example embodiments.

FIG. 5 depicts a block diagram illustrating an example of a computing system 500 consistent with implementations of the current subject matter. Referring to FIGS. 1-5, the computing system 500 may implement the database execution engine 150 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the database execution engine 150. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor, and at least one memory storing instructions which, when executed by the at least one data processor, cause operations comprising:
identifying, within a sequence of operations comprising a query pipeline for executing a query on a database table divided into multiple partitions and stored across multiple computing nodes, a first operation ingesting non-standardized data, the first operation being performed at a first computing node;
inserting, before the first operation, a second operation to serialize at least a portion of the non-standardized data by generating a relational table populated by at least the portion of the non-standardized data, the second operation being performed at a second computing node different from the first computing node;
facilitating exchange of the non-standardized data between the first and second operations, by providing the relational table generated by the second operation at the second computing node to the first computing node such that the first operation ingests at least the portion of the non-standardized data; and
executing the query by at least performing the sequence of operations comprising the query pipeline.

2. The system of claim 1, wherein the database table is divided into the multiple partitions via a partitioning algorithm including one or more of hash partitioning, round-robin partitioning, and range partitioning, storage of each of the partitions being distributed across the multiple computing nodes.

3. The system of claim 2, wherein each row of the relational table is populated with a different type of the non-standardized data.

4. The system of claim 2, wherein each column of the relational table is populated with a different type of the non-standardized data.

5. The system of claim 1, wherein the non-standardized data includes one or more data statistics.

6. The system of claim 5, wherein the one or more data statistics include a row count, a column count, and/or a datatype.

7. The system of claim 1, wherein the non-standardized data includes synchronization information.

8. The system of claim 7, wherein the synchronization information includes a versioning timestamp and/or a table identifier.

9. The system of claim 1, wherein the non-standardized data includes a type of algorithm applied to execute the query, temporary and/or auxiliary data structures used during the executing of the query, information about parallelization or scheduling, and/or status information.

10. The system of claim 1, wherein the non-standardized data is output by a third operation preceding the first operation, and wherein the second operation is inserted between the first operation and the third operation.

11. The system of claim 1, wherein the non-standardized data is output by a source external to the query pipeline.

12. The system of claim 1, wherein the operations further comprise:
in response to determining that the first operation operates on the non-standardized data in its original format, inserting, between the second operation and the first operation, a third operation to convert the portion of the non-standardized, which is serialized, data back to the original format for use by the first operation.

13. A computer-implemented method, comprising:
identifying, within a sequence of operations comprising a query pipeline for executing a query on a database table divided into multiple partitions and stored across multiple computing nodes, a first operation ingesting non-standardized data, the first operation being performed at a first computing node;
inserting, before the first operation, a second operation to serialize at least a portion of the non-standardized data by generating a relational table populated by at least the portion of the non-standardized data, the second operation performed at a second computing node different from the first computing node;
facilitating exchange of the non-standardized data between the first and second operations, by providing the relational table generated by the second operation at the second computing node to the first computing node such that the first operation ingests at least the portion of the non-standardized data; and
executing the query by at least performing the sequence of operations comprising the query pipeline.

14. The method of claim 13, wherein the database table is divided into the multiple partitions via a partitioning algorithm including one or more of hash partitioning, round-robin partitioning, and range partitioning, storage of each of the partitions being distributed across the multiple computing nodes.

15. The method of claim 13, wherein the non-standardized data includes one or more data statistics comprising at least one of a row count, a column count, or a datatype.

16. The method of claim 13, wherein the non-standardized data includes synchronization information comprising at least one of a versioning timestamp or a table identifier.

17. The method of claim 13, wherein the non-standardized data includes a type of algorithm applied to execute the query, temporary and/or auxiliary data structures used during the executing of the query, information about parallelization or scheduling, and/or status information.

18. The method of claim 13, wherein the non-standardized data is output by a third operation preceding the first operation or a source external to the query pipeline.

19. The method of claim 13, further comprising:
in response to determining that the first operation operates on the non-standardized data in its original format, inserting, between the second operation and the first operation, a third operation to convert the portion of the non-standardized, which is serialized, data back to the original format for use by the first operation.

20. A non-transitory computer readable medium storing instructions, which when executed by at least one data processor, result in operations comprising:
identifying, within a sequence of operations comprising a query pipeline for executing a query on a database table divided into multiple partitions and stored across multiple computing nodes, a first operation ingesting non-standardized data, the first operation being performed at a first computing node;
inserting, before the first operation, a second operation to serialize at least a portion of the non-standardized data by generating a relational table populated by at least the portion of the non-standardized data, the second operation be performed at a second computing node different from the first computing node;
facilitating exchange of the non-standardized data between the first and second operations, by providing the relational table generated by the second operation at the second computing node to the first computing node such that the first operation ingests at least the portion of the non-standardized data; and executing the query by at least performing the sequence of operations comprising the query pipeline.

* * * * *